(12) United States Patent
Morin et al.

(10) Patent No.: US 8,318,101 B2
(45) Date of Patent: Nov. 27, 2012

(54) OIL-DERIVED HYDROCARBON CONVERTER HAVING AN INTEGRATED COMBUSTION INSTALLATION COMPRISING CARBON DIOXIDE CAPTURE

(75) Inventors: Jean-Xavier Morin, Neuville Aux Bois (FR); Corinne Beal, Voisins le Bretonneux (FR); Silvestre Suraniti, Aix En Provence (FR)

(73) Assignee: ALSTOM Technology Ltd, Baden (CH)

( * ) Notice: Subject to any disclaimer, the term of this patent is extended or adjusted under 35 U.S.C. 154(b) by 439 days.

(21) Appl. No.: 12/086,659

(22) PCT Filed: Dec. 22, 2006

(86) PCT No.: PCT/FR2006/051415
§ 371 (c)(1),
(2), (4) Date: Jun. 17, 2008

(87) PCT Pub. No.: WO2007/074304
PCT Pub. Date: Jul. 5, 2007

(65) Prior Publication Data
US 2010/0104482 A1   Apr. 29, 2010

(30) Foreign Application Priority Data
Dec. 27, 2005   (FR) ...................... 05 54103

(51) Int. Cl.
*B01J 8/18* (2006.01)
*F27B 15/00* (2006.01)
(52) U.S. Cl. ........ 422/144; 422/139; 422/142; 422/145; 422/147; 208/113; 208/121; 208/149
(58) Field of Classification Search .............. 422/139, 422/142, 144, 145, 147; 208/113, 121, 149
See application file for complete search history.

(56) References Cited

U.S. PATENT DOCUMENTS
4,280,898 A * 7/1981 Tatterson et al. ............. 208/119
(Continued)

FOREIGN PATENT DOCUMENTS
FR          2850156         7/2004
(Continued)

OTHER PUBLICATIONS
Lyon, R.K., et al., "Pollution Free Combustion of Coal and Other Fossil Fuels", Meeting of the Western States Section of the Combustion Institute, Oct. 26, 1998, pp. 1-12.
(Continued)

*Primary Examiner* — Walter D Griffin
*Assistant Examiner* — Lessanework Seifu
(74) *Attorney, Agent, or Firm* — Robert D. Crawford

(57) ABSTRACT

The invention relates to an oil-derived hydrocarbon converter comprising a catalytic cracking vessel (1) in the presence of catalyst particles in fluidized phase and a regenerator, for regenerating said catalyst particles by burning off the coke deposited on them, said catalyst circulating between said cracking vessel and said regenerator, said regenerator being a reactor (2) integrated into a combustion installation for steam generation comprising carbon dioxide capture. According to the invention, said regenerator is a reduction reactor (2) for an oxygen support, which is fed with solid fuel, comprising said particles provided with coke, and is equipped with a cyclone (C2) for separating the solids and with exchangers (E2), this reduction reactor for said oxygen support being associated with an oxidation reactor (3) for said oxygen support and equipped with a cyclone (C3) for separating the solids and with exchanges (E3), said oxygen support circulating between these two reactors, and in that said oxygen support consists of metal oxide particles having a mean diameter different from that of said catalyst particles.

16 Claims, 1 Drawing Sheet

U.S. PATENT DOCUMENTS

| | | | |
|---|---|---|---|
| 4,522,704 A * | 6/1985 | Bertsch | 208/113 |
| 4,623,443 A * | 11/1986 | Washer | 208/67 |
| 5,147,527 A | 9/1992 | Hettinger | |
| 2005/0133419 A1 | 6/2005 | Long et al. | |

FOREIGN PATENT DOCUMENTS

| | | |
|---|---|---|
| FR | 2871554 | 12/2005 |
| GB | 1500357 | 3/1975 |
| WO | WO 2005/026070 | 3/2005 |

OTHER PUBLICATIONS

PCT International Search Report (PCT/FR2006/051415) dated Apr. 27, 2007.

* cited by examiner

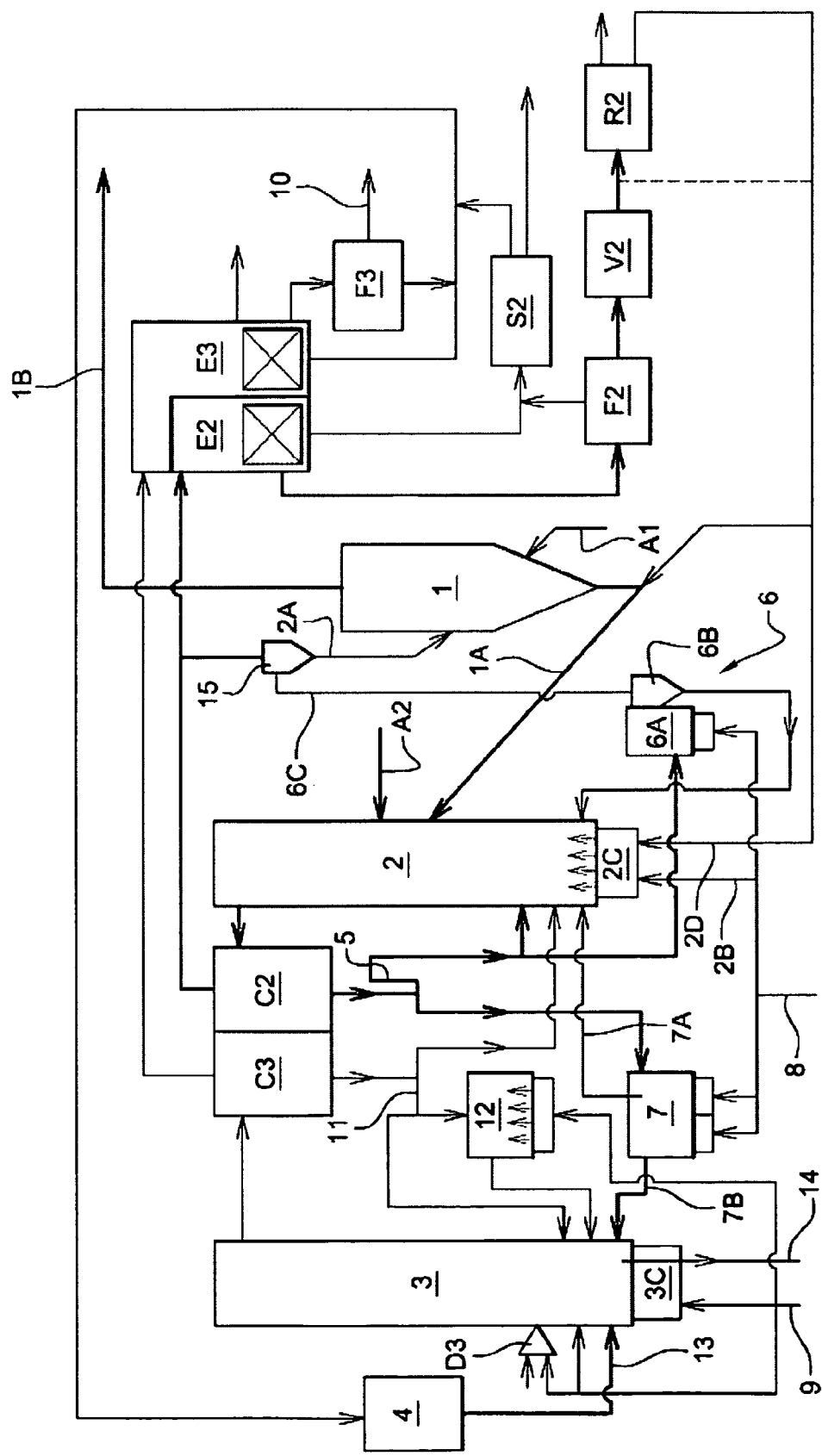

OIL-DERIVED HYDROCARBON CONVERTER HAVING AN INTEGRATED COMBUSTION INSTALLATION COMPRISING CARBON DIOXIDE CAPTURE

TECHNICAL FIELD

The invention relates to an oil-derived hydrocarbon converter coupled to an integrated combustion installation with a carbon dioxide trap.

BACKGROUND

Such an oil-derived hydrocarbon converter includes a hydrocarbon catalytic cracking baffle in the presence of catalyst particles in fluidized phase and which fractionated oil cuts are recovered by ballistic separation of the particles and these fractional oil cuts. In this first baffle is customarily associated a catalyst particle regenerator, on which coke is deposited within the cracking vessel. In this regenerator, the catalyst particles are regenerated by burning the coke and are then recycled towards the cracking baffle.

These types of installation are described in patent documents FR 2 625 509, FR 2 753 453 and FR 2 811 327.

Conventionally to achieve the combustion of coke in the regenerator by means of injected air at the base of the regenerator and the combustion gas containing in part carbon dioxide, resulting from the reaction of the oxygen in air and the carbon constituting the coke, is evacuated at the top part of the regenerator.

Carbon dioxide is a greenhouse-effect gas that should be reduced from emissions, bringing about a total or partial capture of this dioxide.

The carbon dioxide can be captured in a reactor by washing with a solvent, for example, monoethanolamine, which selectively solubilises the carbon dioxide. The solvent is then regenerated by extracting the carbon dioxide due to heating by injecting steam in another reactor then the regenerated solvent is returned to the scrubber unit. However, this solution has to be treated with nitrogen, which is also evacuated in part with the carbon dioxide at the top of the catalyst regenerator, which means proportioning the carbon dioxide trap in proportion with the quantity of nitrogen present. Furthermore, the thermal regeneration entails the inconvenience of requiring large quantities of steam. This solution therefore consumes a lot of energy.

Consequently, replacing the nitrogen diluent by recycled carbon dioxide and burning with an $O_2/CO_2$ oxidizer. However, the oxygen is produced from air by using an air separation unit with a cryogenic system that consumes a lot of energy.

Another process known to carry out gas combustion with integrated recuperation of carbon dioxide while using a metallic oxide used as an oxygen vehicle support. This oxide circulates between two reactors in which it is oxidized in a fluidized bed reactor circulating by mixing with air, is reduced by mixing with the gaseous fuel. This process has an advantage of not requiring an air separation unit since the oxide forms the oxygen support.

These carbon dioxide capturing processes have the inconvenience of increasing the investment cost twofold and they require large areas.

Therefore it has been considered as described in the patent document FR 2 850 156 to make a carbonaceous solid combustion facility to include a reactor for reducing oxides, a first cyclone, an exchanger for flue gas heat recovery, a reactor for oxidizing oxides, a second cyclone, exchangers for controlling temperature of the circulating oxides, in which circulates an oxide which is reduced and then oxidized in each of both reactors. According to this prior art, the solid combustible material is milled before entering the oxide reduction reactor. The oxides are reduced by first of all having them in contact with the fuel which reacts with the oxygen released by the oxide and then oxidized by contact with air which regenerates the oxide. The reduced size of the solid fuel particles allows more complete and faster combustion and production of nearly 100% of fly ash.

This type of facility for combustion of carbonaceous solid materials operating at atmospheric pressure with integrated capture of carbon dioxide does not require any prior air separation. Because of the simplicity and the compactness of this system the costs of capturing carbon dioxide may be reduced while providing production of steam for generating electricity.

The invention proposes an integration of a system of this type to capture the carbon dioxide emitted in a hydrocarbon conversion facility such as specified above. By using the invention, the carbon dioxide is captured, while providing the production of steam intended for the production of energy, and an optimal size and cost.

SUMMARY

To do this, the invention proposes an oil-derived hydrocarbon conversion facility including a catalytic cracking baffle in the presence of catalyser particles in fluidized phase and a regenerator of the said catalyser particles by burning coke deposited on these, the said catalyst circulating between the said cracking vessel and said regenerator, the said regenerator being a reactor integrated in a combustion facility to produce steam including capturing the carbon dioxide, characterized in that the said regenerator is a reduction reactor for an oxygen support, supplied with solid fuel including the said particles supplied with coke and equipped with a separation cyclone for the solids and exchangers, this reduction reactor for the said oxygen support being associated with an oxidization reactor for the said oxygen support and equipped with a separation cyclone for the solids and exchangers, the said oxygen support circulating between these two reactors and in that the said oxygen support is constituted from metallic oxide particles of average diameter different from that of the aforesaid catalyser particles.

So is achieved the integration of a circulating loop for the catalyser particles, providing the conversion of the oil-derived hydrocarbons, and an oxygen support circulating loop, providing a energy-producing combustion and capturing the carbon dioxide.

By carefully choosing the catalytic cracking material, the said oxygen support can be constituted with the said catalyst particles.

Generally, the said oxygen support is formed from average diameter metallic oxide particles different from the said catalyst particles.

According to a preferred method, the said reduction reactor is a circulating fluidized bed fluidized by the steam and/or the recycled carbon dioxide and/or sulphur dioxide.

Advantageously, the installation includes in the cyclone outlet of the reduction reactor a siphon separating said metallic oxide particles directed towards the oxidization reactor and said catalyst particles directed towards the cracking baffle.

It can be set up, between the said cyclone outlet of the reduction reactor and the said cracking baffle, a granulometric sorter re-injecting the metallic oxide particles into the reduction reactor and the catalyst particles into the cracking baffle.

In this case, preferably, the said granulometric sorter has a circulating fluidized bed equipped with a separation cyclone.

Preferably, said catalyst particles are re-introduced into the said cracking baffle by means of a rising duct of a defined height of which the load loss compensates the difference in pressure between the said baffle and the said granulometric sorter. This balances the difference in pressure between the circulation loop of the catalyst particles and the circulation loop of the metallic oxide particles.

The ratio between the average diameter of the metallic oxide particles and the catalyst particles is advantageously higher than 2:1.

Said metallic oxides can include iron oxide.

Said catalyst particles can consist of nickel oxide.

To provide requirements in steam or electricity, it is possible that said solid fuel also includes oil residues, such as pitch, bitumen or asphalt, to generate sufficient power.

BRIEF DESCRIPTION OF THE DRAWINGS

The invention is described in detail below together with a diagram which only represents a preferred method of carrying out the invention.

This diagram represents an installation conforming with the invention.

DETAILED DESCRIPTION

This installation includes an oil-derived hydrocarbon converter including a catalytic cracking baffle 1 in the presence of catalyst particles in a fluidized phase that is fed by a duct A1 and a catalyst particle regenerator 2 by combusting the coke deposited on these, the catalyst circulating between the cracking baffle 1 and the regenerator 2. The catalyst particles are evacuated from the cracking baffle towards the regenerator by a supply duct 1A and are re-injected from this regenerator towards the cracking baffle by a re-injection duct 2A. Some fractional oil cuts are obtained from the cracking baffle outlet by an outlet duct 1B. In such a cracking baffle, the temperature is around 650° C. and the pressure about 2 bars.

According to the invention, the regenerator 2 is a reactor integrated in a combustion installation for producing steam with a carbon dioxide trap.

This regenerator 2 is a reduction reactor for an oxygen support, preferably formed from average diameter metallic oxide particles different from the catalyst particles, supplied in solid fuel including the particles provided from coke by the supply duct 1A and equipped with a separation cyclone C2 for the solids and exchangers E2. The solid fuel fed by the duct A2 can also include oil residues.

This reduction reactor is a heat source to the circulating fluidized bed fluidized with the steam by a supply duct 2B and an air box 2C introducing the fluidization steam in the lower part of the reduction reactor 2. This steam is mixed with the carbon dioxide or the sulphur dioxide recycled by an additional duct 2D clearing in the same air box 2C. In such a combustion reactor, the temperature is around 900° C. and the pressure is atmospheric pressure.

Generally speaking, the said reduction reactor 2 is a circulating fluidized bed fluidized by the steam and/or the recycled carbon dioxide and/or sulphur dioxide.

In the top part of the reduction reactor 2 is installed the cyclone C2 where the solid particles separated from the fly ash and the combustion gases containing carbon dioxide, sulphur dioxide and steam.

The fly ash and the combustion gases are brought to the heat exchangers E2 and steam generators for the production of electricity. The fly ash is separated from the combustion gases in a bag filter F2. The combustion gases are then sent into a cooling and condensation circuit R2 via a fan V2. This circuit extracts water and the remaining $H_2SO_4$ from the carbon dioxide which is then partially reintroduced into the reactor 2 by the additional duct 2D. The fly ash is separated from the metallic oxide particles by a granulometric separator S2 to be stocked in a silo, whereas the metallic oxide particles are sent towards a silo 4.

The solid particles coming from the C2 separator, containing metallic oxide particles, regenerated catalyst particles and carbon residues, pass via a siphon 5 from where a first part is sent into a granulometric separator 6 intended for separating the metallic oxide particles and the catalyst particles and which will be made clear further on. A second part coming from the cyclone is discharged towards a elimination device for the carbon residue 7.

This elimination device 7 is fluidized by the steam from a steam inlet duct 8, also supplying the feed duct 2B of the reduction reactor 2. This fluidization separates the fine and light particles such as the carbon residual from the metallic oxide particles and reintroduces them into the reduction reactor 2 via a duct 7A, while the denser and larger metallic oxide particles are transferred by a duct 7B towards a second reactor 3 that is an oxidization reactor. A composition example of such an elimination device 7 is described in the patent document FR 2 850 156.

The oxidization reactor 3 is equipped with a starting system D3 that is supplied with fuel such as gas, a system of introducing the metallic oxide particles from the oxides silo 4 and a fluidization and oxidization system by a supply duct 9. This starting system D3 reheats the reactors and the solids circulation loops up to a temperature threshold higher than 700° C. and starts the reactions.

The oxidization reactor 3 for the oxygen support, containing metallic oxide particles of an average diameter different from the catalyst particles, is equipped with a separation cyclone for the solids C3 and exchangers E3.

A bed composed of metallic oxides circulates in the oxidization reactor 3 that is fluidized by air coming from the inlet duct 9 supplying an air box 3C. In such an oxidization reactor, the temperature is around 1000° C. and the pressure is atmospheric pressure.

The metallic oxide particles and exhausted air, after oxidization in the reactor in question 3, passes into the solids separation cyclone C3 where the metallic oxide particles are separated from the constituted gases essentially nitrogen, oxygen and fly ash.

The hot gases are cooled in the heat exchangers E3 and steam generator for the production of electricity. The oxide particles carried along are separated from the air by a bag filter F3 and reintroduced into the oxide silo 4, while an exhaust fan sends back air into the atmosphere via a chimney 10.

The solid particles that have been extracted in the cyclone C3 pass by to a siphon 11 from where a first part is transferred into the base of the reduction reactor 2, a second part is re-circulated into the base of the oxidization reactor 3 and a third part is sent towards an outside bed 12 by air supplied by the air inlet duct 9 where a fluidized heat exchanger is situated, then finally reintroduced into the oxidization reactor 3. This exchanger controls the temperature in the oxidization reactor 3.

Extra metallic oxide particles in the oxidization reactor 3 are possible from the oxide silo 4 via the duct 13. Extra oxide particles can be justified to compensate the losses by attrition in the different reactors 2 and 3, so as to provide sufficient oxides to ensure the transfer of materials and the circulation of the solids. The large ash particles or agglomerates are periodically extracted by an extraction duct 14 at the bottom of the oxidation reactor to a recovery silo.

As already mentioned, between the reduction reactor cyclone outlet C2 and the cracking baffle 1, there is a granulometric sorter 6 re-injecting the metallic oxide particles into the reduction reactor 2 and the catalyst particles into the cracking baffle 1.

In the said, in effect, it is anticipated that the oxygen support is made up of metallic oxide particles different from the catalyst particles, which are, for example, made up from nickel oxide. This metallic oxide preferably includes iron oxide and could also be manganese oxide, copper or nickel.

Equally within the framework of the invention, this oxygen support can be formed from the catalyst particles themselves. In this case, the granulometric sorter 6 is not required.

To effectively sort the particles, when the oxide particles are different from the catalyst particles, the granulometry of these particles is chosen so that the ratio between the average diameter of the oxide particles and the catalyst particles is higher than 2:1. By way of example, the oxide particles have an average diameter of about 160 microns and the catalyst particles have an average diameter of about 60 microns.

The granulometric sorter 6 is formed from a circulating fluidized bed 6A supplied in steam via the inlet duct 8 and equipped with a separation cyclone 6B sized to carry out the sorting. In the lower part of the cyclone 6B in question, the evacuated oxide particles that are re-injected into the lower part of the reduction reactor 2. In the top part of the cyclone 6B in question, the catalyst particles are sent back into the cracking baffle 1, by means of a rising duct 6C of a defined height from which the load loss compensates the difference in pressure between the cracking baffle 1 and the granulometric sorter 6. This transfer is done via a hopper 15.

The cycle of the different reactions will now be described.

The oil-derived hydrocarbons and the catalyst particles are introduced into the cracking baffle 1. Fractional oil cuts are obtained and the catalyst particles charged with coke and therefore carbon are evacuated in the reduction reactor 2, possibly with oil residues.

This reduction reactor 2 being a circulating fluidized bed, an increased time delay in this reactor is obtained because of the internal circulation of the solids in this reactor and the recirculation via its cyclone C2. The volatile materials clear very quickly after reheating the fuel and reacts with the oxygen cleared by the oxygen vehicle metallic oxide to perform a partial combustion that continues with the combustion of the fixed carbon, ensuring the elimination of coke carried by the catalyst particles that are regenerated on one hand, and on the other hand the reduction in possibly additional metallic oxide particles.

A part of the oxide bed is extracted at the bottom of the siphon 5 situated under the cyclone associated with this reduction reactor 2, to be purified from the carbon residues that have not been transformed into fly ash, using the elimination device 7 that forms a barrier to the carbon in the installation, then reintroduced into the oxidization reactor 3 to be oxidized by the oxygen in the air.

Due to this carbon barrier, no carbon residual is transferred into the oxidization reactor 3. Thus, it is not produced from carbon dioxide, which would reduce the efficiency in capturing the carbon dioxide from the installation.

Air weak in oxygen coming from the oxidization reactor 3 is cooled in the heat exchanger E3, that for practical purposes is formed from a plurality of exchangers, then any dust is removed in the bag filter F3 and sent back out to the atmosphere.

The oxide particles regenerated after their passage into the oxidization reactor 3 are sent back towards the reduction reactor 2 to start a new cycle of transporting oxygen from the oxidization 3 reactor towards the reduction reactor 2. The quantity of oxides sent back into the reduction reactor 2 can be controlled by a flow control valve (not shown).

Another part of the oxide bed extracted with the siphon base 5 situated under the cyclone associated with the reduction reactor 2, is directed on the one hand downwards from the reduction reactor 2 to maintain a circulation of solids in the reactor 2, and on the other hand towards the granulometric sorter 6, that separates the regenerated catalyst particles that are re-injected into the cracking baffle 1 and the residual oxide particles which are reintroduced into the base of the reduction reactor.

As mentioned earlier, it is possible to use as a cracking catalyst, an oxygen support which can also ensure the oxygen circulation loop between the two reactors 2 and 3. The installation is simplified since it is not then required to carry out the granulometric sorting done by the sorter 6.

What is claimed is:

1. Oil-derived hydrocarbon conversion system comprising:
    a catalytic cracking baffle having catalyser particles in fluidized phase disposed therein, wherein coke is deposited on the catalyser particles;
    a reduction reactor having catalyser particles with coke deposited thereon in a circulating fluidized bed, wherein the reduction reactor is supplied with fuel, oxidized oxygen support, and the catalyser particles deposited with coke for burning the fuel, coke, and oxygen from the oxygen support to provide regenerated catalyser particles and reduced oxygen support,
    a first separator cyclone coupled to an exit of the reduction reactor, adapted to separate the solid catalyzer particles and reduced oxygen support from gas exiting the reduction reactor;
    an oxidization reactor adapted to receive reduced oxygen support and oxidize them; and
    a granulometric sorter disposed between an outlet of the first separation cyclone and the catalytic cracking baffle that receives a mixture of the regenerated catalyser particles and the reduced oxygen support particles and separates them, wherein the regenerated catalyser particles are provided to the catalytic cracking baffle and the reduced oxygen support is provided to the oxidization reactor.

2. The conversion system of claim 1, wherein the reduction reactor is a circulating fluidized bed fluidized by steam, recycled carbon dioxide, and/or sulphur dioxide.

3. The conversion system of claim 1, wherein the oxygen support particles comprise from metallic oxide particles of an average diameter different to the said catalyser particles.

4. The conversion system of claim 1, further including a second separator cyclone for separating solid particles and gas exiting the oxidation reactor and providing the solid particles to the reduction reactor.

5. The conversion system of claim 1, further includes a siphon coming from the first separator cyclone that separates metallic oxide particles directed towards the oxidization reactor and said catalyst particles directed toward the cracking baffle.

6. The conversion system of claim 1, wherein the granulometric sorter is formed from of a circulating fluidized bed equipped with a third separation cyclone.

7. The conversion system of claim 1, wherein the catalyser particles are re-injected into the cracking baffle by means of a rising duct of a defined height of which the load loss compensates the difference in pressure between the catalytic cracking baffle and the granulometric sorter.

8. The conversion system of claim 3, wherein the ratio between the average diameter of the metallic oxide particles and the catalyser particles is higher than 2:1.

9. The conversion system of claim 3, wherein the metallic oxides include iron oxide.

10. The conversion system of claim 1, wherein the catalyser particles include nickel oxide.

11. The conversion system of claim 1, wherein the reduction reactor is adapted to use solid fuel.

12. The conversion system of claim 1, wherein the catalyser particles and the oxygen support are substantially the same.

13. The conversion system of claim 1, further comprising a heat exchanger, wherein the reduction reactor is coupled to the heat exchanger to provide heat to the heat exchanger to generate steam.

14. The conversion system of claim 11, wherein the reduction reactor is adapted to receive oil residues as fuel.

15. The conversion system of claim 1, further includes a particle separator to separate solid particles from the combustion gas of the reduction reactor, wherein the combustion gas includes carbon dioxide.

16. The conversion system of claim 11, further includes a conventional condenser that condenses the combustion gas to provide carbon dioxide for capture.

* * * * *